C. F. SPEIDEL, R. KROEDEL & W. A. RIDDELL.
FOCUSING FINDER FOR PHOTOGRAPHIC CAMERAS.
APPLICATION FILED AUG. 17, 1916.

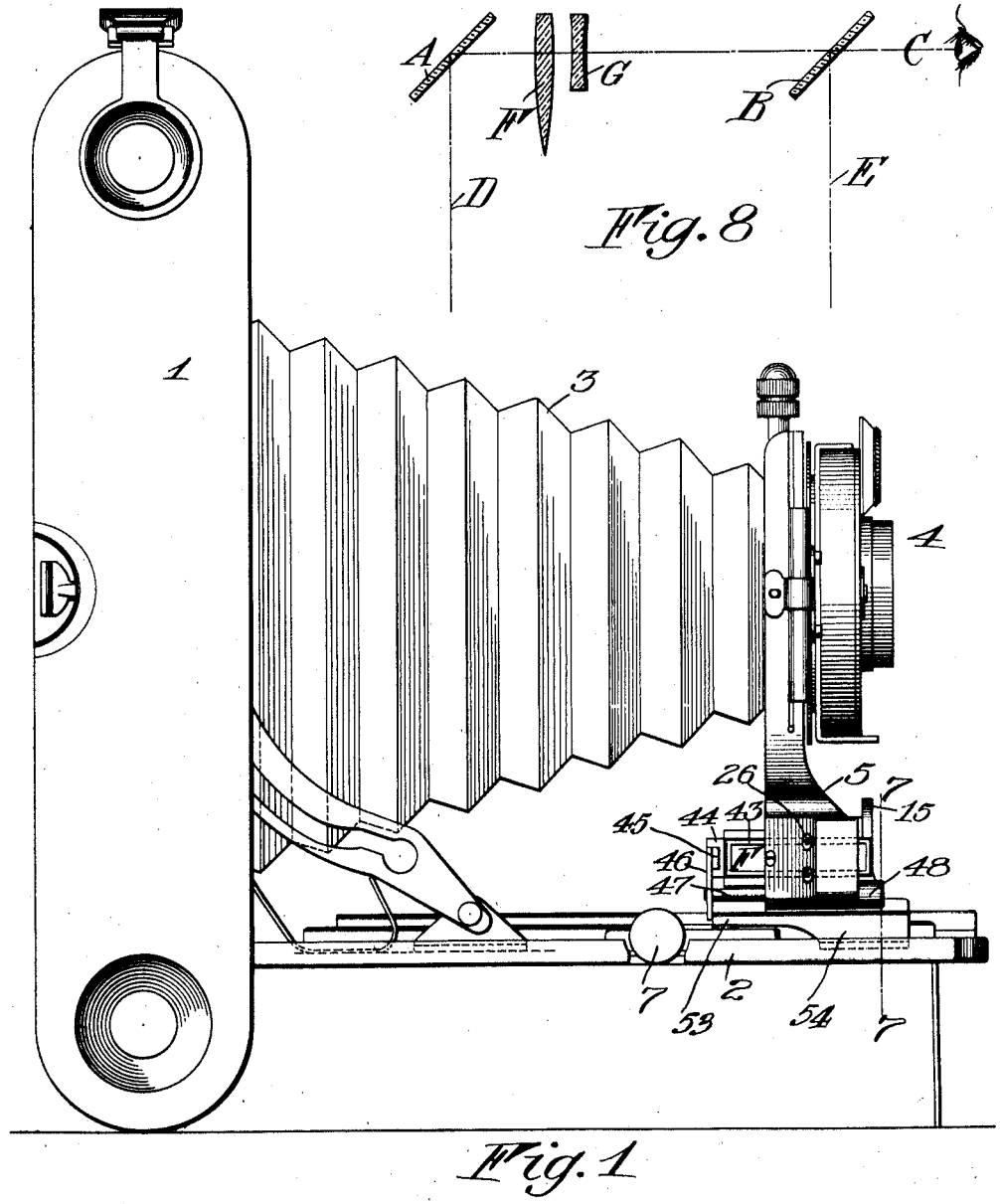

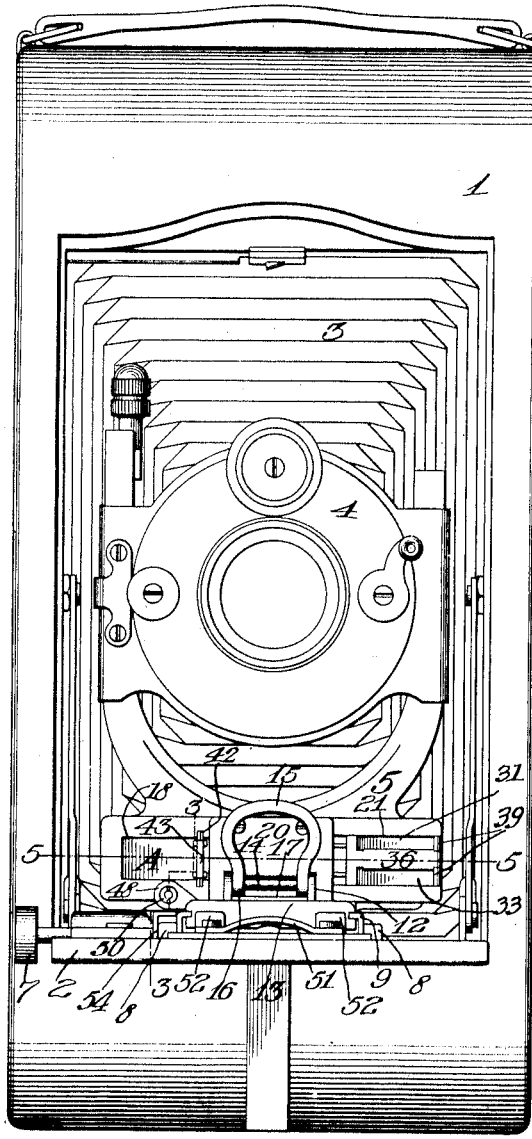
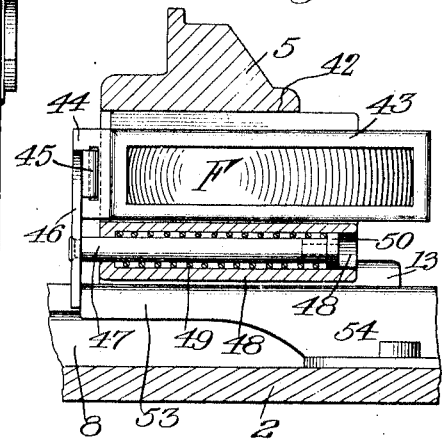
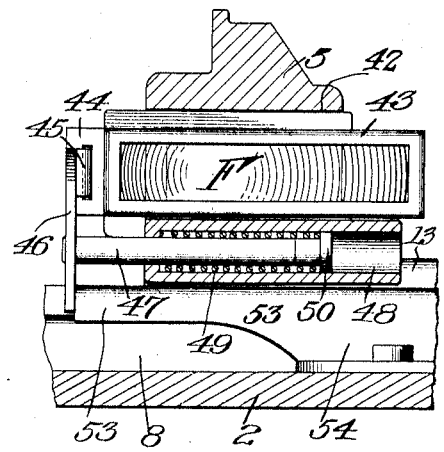

1,257,648.

Patented Feb. 26, 1918.

WITNESSES:
Nelson H. Copp

INVENTORS
Charles F. Speidel
Robert Kroedel
William A. Riddell
by
their ATTORNEYS.

UNITED STATES PATENT OFFICE.

CHARLES F. SPEIDEL, ROBERT KROEDEL, AND WILLIAM A. RIDDELL, OF ROCHESTER, NEW YORK, ASSIGNORS TO EASTMAN KODAK COMPANY, OF ROCHESTER, NEW YORK, A CORPORATION OF NEW YORK.

FOCUSING-FINDER FOR PHOTOGRAPHIC CAMERAS.

1,257,648.     Specification of Letters Patent.     Patented Feb. 26, 1918.

Application filed August 17, 1916. Serial No. 115,544.

*To all whom it may concern:*

Be it known that we, CHARLES F. SPEIDEL, ROBERT KROEDEL, and WILLIAM A. RIDDELL, all of Rochester, in the county of Monroe and State of New York, have invented certain new and useful Improvements in Focusing-Finders for Photographic Cameras; and we do hereby declare the following to be a full, clear, and exact description of the same, reference being had to the accompanying drawings, forming a part of this specification.

Our present invention relates to photography, and more particularly to photographic cameras, and it has for its object to provide in combination with a camera a focusing finder of the telemeter type, which will be so constructed and arranged as to be simple, convenient and accurate, though not difficult to assemble, and wherein the parts will be so protected as to greatly reduce the probability of their becoming disarranged. To these and other ends the invention consists in certain improvements and combinations of parts, all as will be hereinafter more fully described, the novel features being pointed out in the claims at the end of the specification.

In the drawings :

Figure 1 is a side elevation of a folding camera, provided with a focusing finder constructed in accordance with and illustrating one embodiment of our invention;

Fig. 2 is a front view thereof;

Fig. 3 is a fragmentary enlarged section taken substantially on the line 3—3 of Fig. 2, with the parts in one position of adjustment;

Fig. 4 is a similar view, with the parts in another position;

Fig. 8 is a diagrammatic view, illustrative of the optical principles involved.

Similar reference characters in the several figures indicate the same parts.

Figure 5:
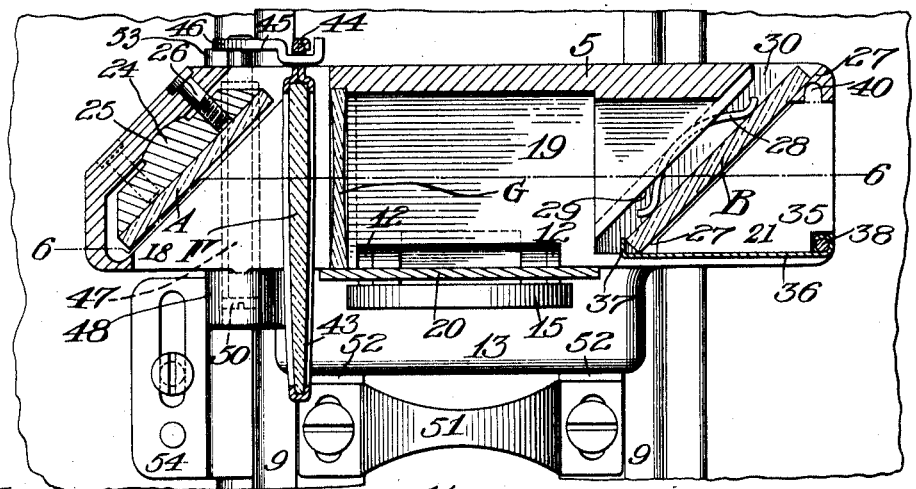
Fig. 5 is an enlarged section taken substantially on the line 5—5 of Fig. 2.

Referring to Fig. 8, we will first briefly explain the optics of the telemetric features of the invention. A and B represent two substantially parallel mirrors or reflectors arranged to reflect separate rays of light from the same object toward a common viewpoint C, the degree of separation of the mirrors providing a base line. Assuming that the object is at an infinite distance, the rays of light D, E will be parallel, and will register at the point C. If, however, the object is appreciably near, one of the rays will be angular to the other. Assuming that E is the direct ray, and D the angular ray, the angle of incidence will be greater at the mirror A than at the mirror B, and there will be a lack of register in the image at C. There are therefore interposed in the path of the ray D, preferably after reflection, a pair of complementary lenses F and G of the same focal length, the former being a positive and the latter a negative lens. When these lenses are in axial register, they do not deflect the ray D, and this is their position when the object is at infinity. If one lens is moved relatively to the other, however, in its own plane, so that their axes no longer coincide, the ray D is bent or deflected in proportion to the degree of such movement, and in this way the relatively angular ray D from a near object, incident at A, may be redirected to approach C parallel with the ray E, and hence produce a two-part image at the viewpoint C with the components in register. In the present instance, F is the movable lens, and its movement is controlled by the movement of the lens carriage or focusing element of the camera, so that when the rays D and E are in register at C, the camera carriage is at a proper point to focus the camera lens on the object, without recourse to a scale or any observation other than that of the two-part image appearing at C. When the object is at infinity, the lenses F, G will be undisturbed by the camera carriage and remain in axial coincidence. Of course, the focal lengths of the lenses F and G must be coördinated to the focal length of the camera lens with reference to the base line A, B.

The camera of the present embodiment is of the usual folding type, comprising a body 1, bed 2, bellows 3 and lens front 4, the latter mounted on a carriage 5. Movable on the bed 2 (Fig. 7) is an extension bed 6 operable by a knob 7 through the usual rack and pinion connection, not shown, and slidable in tracks 8 on the main bed. The extension bed in turn in provided with tracks 9 upon which slides the carriage block or front base 5, the latter being preferably formed of a one-piece casting with track engaging portions 10, as shown in Fig. 6.

As a means for clamping the carriage to the extension bed, a transversely extending lock bar 11 engages beneath the tracks 9 and is provided with vertically disposed ears 12 that have a slight vertical movement in and pass through a forward extension 13 of the carriage. Journaled in the upper ends of these ears is a shaft 14 carrying a yoke 15 provided with cams 16 at its terminals. The yoke is adapted for manipulation by the fingers of the operator, and when in a horizontal position may be used to draw out the carriage, the cam 16 being then so disposed that the locking bar 11 drops away from gripping contact with the tracks 9. When the carriage has been brought to the desired position, the yoke 15 is raised to the vertical position shown in the figures, and the cams 16 press against a wear plate 17, and by means of the ears 12, draw up the locking bar 11, clamping it tightly against the tracks 9.

Figure 6:
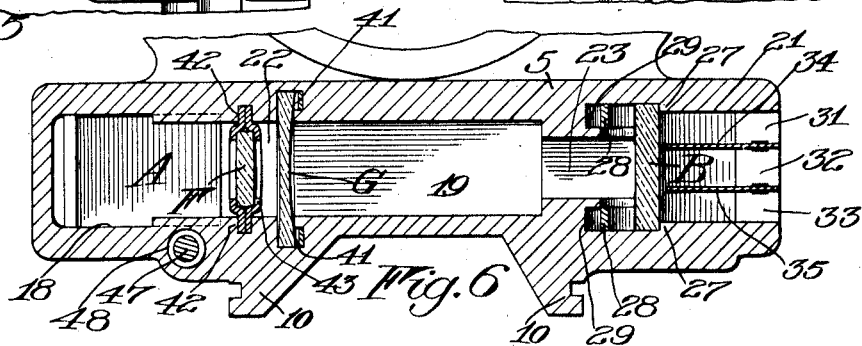
Fig. 6 is a vertical section through the lens carriage, taken substantially on the line 6—6 of Fig. 5.
Figure 7:
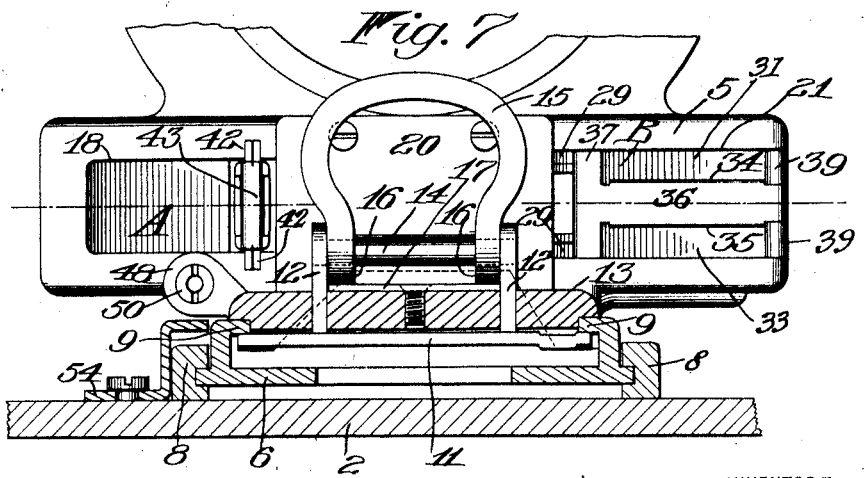
Fig. 7 is an enlarged fragmentary front elevation of the carriage with portions thereof and the bed in vertical section on the line 7—7 of Fig. 1.

We prefer to construct the carriage or base member 5 of an integral block, and in the present instance it is a one-piece casting that is hollowed out to provide three chambers: a mirror chamber 18 at the left, open at the front, a central light chamber 19 closed at the front by a cover plate 20, and a mirror chamber 21 at the right, open at the front and at the right side or end, all as shown in Figs. 6 and 7. In the left chamber 18 is mirror A adapted to receive light rays from the front and to reflect them through the chambers 19 and 21 toward the right and through light wells 22 and 23 connecting the chambers. As shown in Figs. 1 and 5, this mirror A is mounted on a block 24 that rocks in a socket 25 under the influence of adjusting screws 26 by means of which it may be carefully set to an accurate inclination, the said screws providing a three point adjustment, as shown. In the right chamber 21 is mirror B pressed into a seat 27 by means of springs 28 confined in grooves 29 in a wall of the chamber, the said mirror being insertible through an opening 30 at the rear of the chamber. Mirror B being set, mirror A is adjusted into parallelism by the devices heretofore described.

In front of the mirror B, the chamber 21 is divided into three superposed compartments 31, 32 and 33 by partition plates 34 and 35 carried by a front plate 36, (Fig. 7) supported at the front on one side by an angular vertical extension 37, and at the other side by a post 38 having spacing sleeves 39. The partitions 34 and 35 are supported at the rear by ears 40 let into the wall of the chamber. The central portion of the mirror B, opposite the central compartment 32, is left unsilvered, and, therefore, the rays from mirror A are transmitted through the light wells 22 and 23, and the center chamber 19, and pass through this portion of the mirror B to be viewed from a common viewpoint at the right simultaneously with the images reflected from mirror B through compartments 31 and 33. In other words, the object appears at the point of observation as a three-part image, the top and bottom portions of which are cast by the mirror B, and the central portion by the mirror A, so that if the different groups of rays are not parallel the corresponding portions of the image will not be in register as first above explained.

The negative lens G of Fig. 8 is mounted in a seat 41 in the light well 22, and adjacent and parallel to it is a guideway 42 running through the carriage 5 from front to rear. In this guideway is slidably mounted the positive lens F held in a frame 43. An extension 44 of the frame 43 receives an arm 45 on a head 46 (Figs. 1, 3 and 4) carried rigidly by a guide bar 47 that operates in a cylindrical guideway 48 parallel to the guideway 42. A coil spring 49 surrounding the bar 47 within the guideway 48 and interposed between one end of the latter and an enlargement 50 on the guide bar normally holds the latter retracted in the position of Fig. 3, and operates the lens F through the arm 45 (which also acts as a stop) to the forward normal position shown in Figs. 3 and 5, wherein the lenses F and G are in axial alinement for focusing at infinity, as first above explained.

The extension bed 6 being retracted to its normal position, when the camera is extended and the carriage 5 initially drawn out, it is halted for focus at infinity by the engagement of the extension 13 at the front with an adjustable stop 51 at the front of the extension bed 6, said adjustable stop being provided with upstanding flange abutments 52. If, however, the object is at shorter range, and it is necessary to advance the carriage and camera lens farther, the extension bed 6 is projected by means of the knob 7, as previously described, carrying the carriage locked to it by means of the member 15. Upon this forward movement the cross head 46 engages with the end 53 of an adjustable stop plate 54 on the main bed 2, and halts further forward movement of the lens F. The companion lens G, being fixed to the carriage, travels on relatively to the lens F, destroying their axial alinement. The rays from mirror A are bent or deflected in proportion, and when brought into parallelism with the rays of mirror B, it is known that the carriage is in proper focal position. If the carriage and extension bed are moved rearwardly, the spring 49 moves the lens F forwardly until alinement of the two lenses is again obtained, whereat the relative movement ceases and both lenses travel to the rear together with the carriage.

The adjustability of the stops 51 and 54 assists in the initial setting up and correction of the optical group and the arm 45 of the cross head 46 is also capable of being bent slightly for purposes of adjustment.

We claim as our invention:

1. In a focusing finder, the combination with a camera bed and a lens carriage movable thereon, of optical elements on the carriage for producing a two-part image of an object, a pair of lenses also mounted on the carriage and arranged to bend the rays of one part of the image into register with those of the other when the lenses are moved relatively, and means for moving the lenses relatively through the relative movement of the carriage and bed.

2. In a focusing finder, the combination with a camera bed and a lens carriage movable thereon, of optical elements on one of said members for producing a two-part image of an object, a pair of lenses mounted on the same member and arranged to bend the rays of one part of the image into register with those of the other when the lenses are moved relatively, and means for moving the lenses relatively through the relative movement of the carriage and bed.

3. In a focusing finder, the combination with a camera bed and a lens carriage movable thereon and having a mirror seat at each side, a lens seat between the mirror seats and a guide adjacent to the lens seat extending longitudinally of the bed, of mirrors in the mirror seats for producing a two-part image of an object, a pair of lenses for deflecting the rays from one mirror into register with those from the other when the lenses are moved relatively, one of which lenses is arranged in the lens seat and the other of which is movable in the guide, and means for moving the lens in the guide through the relative movement of the carriage and bed.

4. In a focusing finder, the combination with a camera bed and a lens carriage movable thereon, of optical elements on the carriage for producing a two-part image of an object, a fixed and a movable lens mounted on the carriage and arranged to bend the rays of one part of the image into register with those of the other when the lenses are moved relatively, a stop on the bed, and a device on the movable lens adapted to abut the stop to halt the movement of the movable lens at a predetermined point in the travel of the carriage on the bed.

5. In a focusing finder, the combination with a camera bed, an extension bed, and a lens carriage movable on the latter, of optical elements on the carriage for producing a two-part image of an object, a fixed and a movable lens mounted on the carriage and arranged to bend the rays of one part of the image into register with those of the other part when the lenses are moved relatively, a stop on the extension bed for halting the outward movement of the carriage, a stop on the main bed, and a device on the movable lens adapted to abut the last mentioned stop to halt the movement of the movable lens at a predetermined point in the focusing movement of the carriage and extension bed.

6. In a focusing finder, the combination with a camera bed and a lens carriage movable thereon, of optical elements on the carriage for producing a two-part image of an object, a fixed and a movable lens also mounted on the carriage and arranged to bend the rays of one part of the image into register with those of the other when the lenses are moved relatively, a spring tending to operate the movable lens in one direction relatively to the fixed lens, a stop on the bed and a device coöperating with the stop to move the movable lens relatively to the fixed lens in the other direction as the carriage travels beyond a predetermined point on the bed.

7. In a focusing finder, the combination with a camera bed and a lens carriage movable thereon and having two separated guideways extending longitudinally of the bed, of optical elements on the carriage for producing a two-part image of an object, a fixed lens mounted on the carriage and a relatively movable lens slidable in one guideway, said lenses being arranged to bend the rays of one part of the image into register with those of the other part when the lenses are moved relatively, a guide bar on the movable lens slidable in the other guideway, a spring in the latter acting upon the guide bar to operate the movable lens in one direction relatively to the fixed lens, a stop on the bed and a device coöperating with the stop to move the movable lens relatively to the fixed lens in the other direction as the carriage travels beyond a predetermined point on the bed.

CHARLES F. SPEIDEL.
ROBERT KROEDEL.
WILLIAM A. RIDDELL.

Witnesses:
M. JOSEPH SULLIVAN,
HERBERT A. SCHAFFER.